(12) United States Patent
Tohta (10) Patent No.: US 9,856,976 B2
(45) Date of Patent: Jan. 2, 2018

(54) VEHICLE LOCK-UP CLUTCH CONTROL DEVICE

(71) Applicant: Nissan Motor Co., Ltd., Yokohama-shi, Kanagawa (JP)

(72) Inventor: Yuzuru Tohta, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/327,201

(22) PCT Filed: Sep. 3, 2014

(86) PCT No.: PCT/JP2014/073223
§ 371 (c)(1),
(2) Date: Jan. 18, 2017

(87) PCT Pub. No.: WO2016/035170
PCT Pub. Date: Mar. 10, 2016

(65) Prior Publication Data
US 2017/0198810 A1    Jul. 13, 2017

(51) Int. Cl.
*F16H 61/14*  (2006.01)
*F16H 45/02*  (2006.01)
*F16D 48/06*  (2006.01)

(52) U.S. Cl.
CPC .......... *F16H 61/143* (2013.01); *F16D 48/06* (2013.01); *F16H 45/02* (2013.01); *F16D 2500/10412* (2013.01); *F16D 2500/3024* (2013.01); *F16D 2500/3065* (2013.01); *F16D 2500/3067* (2013.01); *F16D 2500/30406* (2013.01); *F16D 2500/502* (2013.01);
(Continued)

(58) Field of Classification Search
CPC .. F16H 61/143; F16H 2061/145; F16D 48/06; F16D 2500/502
See application file for complete search history.

(56) References Cited

U.S. PATENT DOCUMENTS

| 9,255,638 B2 | 2/2016 | Yamawaki et al. |
| 2004/0111203 A1* | 6/2004 | Higashimata ......... F16H 61/143 701/51 |

(Continued)

FOREIGN PATENT DOCUMENTS

| CN | 101542167 A | 9/2009 |
| CN | 104011437 A | 8/2014 |

(Continued)

*Primary Examiner* — Edwin A Young
(74) *Attorney, Agent, or Firm* — Global IP Counselors, LLP (57) ABSTRACT

A lock-up clutch control device is provided for a vehicle having a torque converter with a lock-up clutch disposed between an engine and a continuously variable transmission such that the occurrence of shocks during lock-up engagement is suppressed. The vehicle lock-up clutch control device is provided with a control unit that controls the lock-up capacity based on an engine torque signal when engaging the lock-up clutch. The control unit uses a predictive engine torque as the engine torque signal for use in the lock-up capacity control. The predictive engine torque is calculated based on an engine torque air response delay and a hydraulic response delay in the lock-up differential pressure and is faster in response than the actual engine torque.

7 Claims, 7 Drawing Sheets

(52) U.S. Cl.
CPC ........... *F16D 2500/70247* (2013.01); *F16D 2500/70426* (2013.01); *F16H 2061/145* (2013.01)

(56) References Cited

U.S. PATENT DOCUMENTS

| | | | | |
|---|---|---|---|---|
| 2005/0121277 A1* | 6/2005 | Segawa | ............... | F16H 61/143 192/3.3 |
| 2007/0005211 A1* | 1/2007 | Katsumata | ............ | F16H 61/143 701/67 |
| 2012/0143453 A1* | 6/2012 | Nagami | ............... | F16H 61/143 701/68 |

FOREIGN PATENT DOCUMENTS

| | | |
|---|---|---|
| CN | 104011438 A | 8/2014 |
| JP | 6-109114 A | 4/1994 |
| JP | 11-82726 A | 3/1999 |
| JP | 2011-202776 A | 10/2011 |
| JP | 2011-220388 A | 11/2011 |
| WO | 2013/073394 A1 | 5/2013 |

\* cited by examiner

VEHICLE LOCK-UP CLUTCH CONTROL DEVICE

CROSS-REFERENCE TO RELATED APPLICATIONS

This application is a U.S. National stage application of International Application No. PCT/JP2014/073223, filed on Sep. 3, 2014.

BACKGROUND

Field of the Invention

The present invention relates to a lock-up clutch control device for a vehicle that engages a lock-up clutch of a torque converter.

Background Information

A device that calculates a lock-up capacity command value according to an engine torque signal when engaging the lock-up clutch is known (for example, refer to Japanese Laid-Open Patent Application No. 2011-202776).

SUMMARY

However, in a conventional device, the lock-up capacity command value at the time of lock-up engagement is calculated using an actual engine torque that is inferred from a delay in the engine torque air response as the engine torque signal. Consequently, there is the problem that the balance between the actual engine torque and the actual lock-up capacity is disrupted due to a transient response delay in the engine torque, or a hydraulic response delay in the lock-up differential pressure, leading to a generation of shock upon lock-up engagement.

In view of the problems described above, an object of the present invention is to provide a lock-up clutch control device for a vehicle that is capable of suppressing the generation of shock during the lock-up engagement.

In order to achieve the above object, the present invention is provided with a vehicle lock-up clutch control device for a vehicle having a torque converter with a lock-up clutch between an engine and a transmission. The vehicle lock-up clutch control device is provided with a lock-up capacity control that controls the lock-up capacity based on an engine torque signal, when engaging the lock-up clutch. The lock-up capacity control uses a predictive engine torque as the engine torque signal. The predictive engine torque is calculated based on an engine torque air response delay and a hydraulic response delay in the lock-up differential pressure and is faster in response than the actual engine torque.

Therefore, when engaging the lock-up clutch, the predictive engine torque is used as the engine torque signal for the lock-up capacity control, which is calculated based on an engine torque air response delay and a hydraulic response delay in the lock-up differential pressure and is faster in response than the actual engine torque. That is, if a lock-up capacity control is initiated at a timing that is faster in response than the actual engine torque, the match between the generation timing of the actual engine torque and the generation timing of the actual lock-up capacity is increased by the hydraulic response delay in the lock-up differential pressure. As a result, it is possible to suppress the generation of shock during the lock-up engagement.

DETAILED DESCRIPTION OF THE EMBODIMENTS

A preferred embodiment for realizing the lock-up clutch control device of the present invention is described below based on the first embodiment illustrated in the drawings.

First Embodiment

The configuration is described first. The "Overall system configuration," the "Configuration of the lock-up engagement control process," and the "Configuration of the process for calculating the predictive engine torque" will be separately described regarding the configurations of the lock-up clutch control device in the first embodiment.

Overall System Configuration

Figure 1:
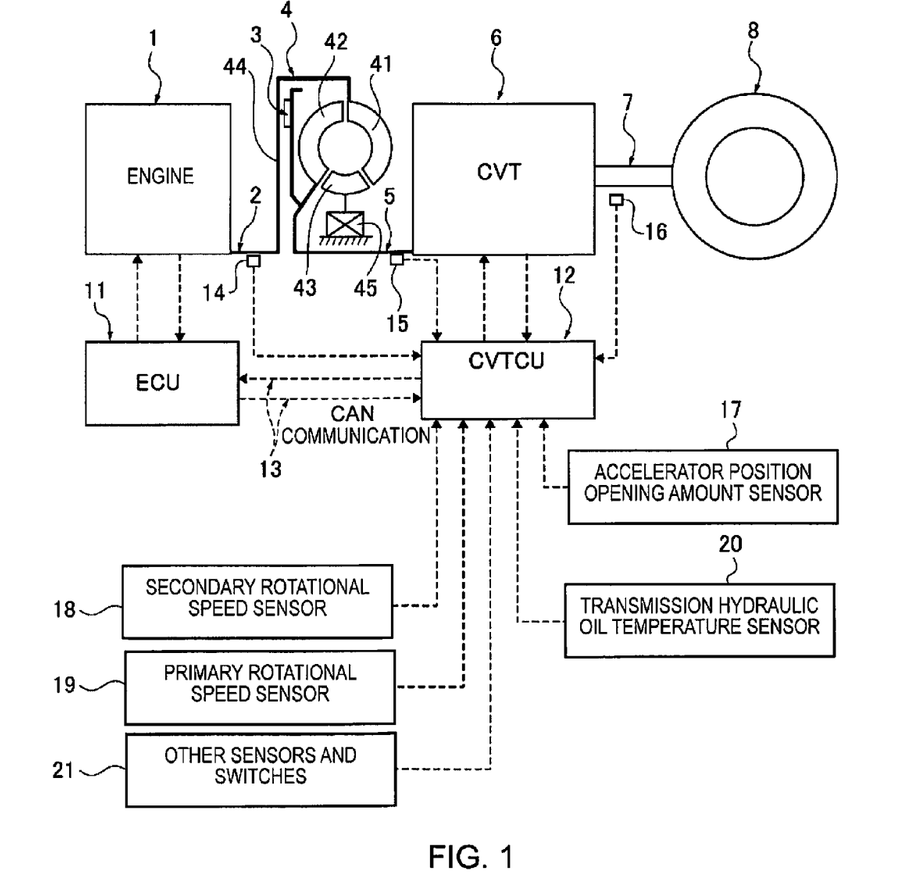
FIG. 1 is an overall system schematic view illustrating an engine-equipped vehicle to which is applied the lock-up clutch control device of a first embodiment.

FIG. 1 illustrates an engine-equipped vehicle to which is applied the lock-up clutch control device of the first embodiment. The overall system configuration will be described below, based on FIG. 1.

The vehicle drive system comprises an engine 1, an engine output shaft 2, a lock-up clutch 3, a torque converter 4, a transmission input shaft 5, a continuously variable transmission 6 (transmission), a drive shaft 7, and drive wheels 8, as illustrated in FIG. 1.

The lock-up clutch 3 is built into the torque converter 4, which couples the engine 1 and the continuously variable transmission 6 via the torque converter 4 by releasing the clutch, and directly connects the engine output shaft 2 and the transmission input shaft 5 by engaging the clutch. The engagement/slip engagement/release of the lock-up clutch 3 is controlled by a lock-up actual hydraulic pressure that is regulated based on the line pressure, which is the original pressure, when a lock-up command pressure is output from a CVT control unit 12, to be described later. The line pressure is produced by regulating, with a line pressure solenoid, the pressure of discharge oil from an oil pump, which is not shown, that is rotationally driven by the engine 1.

The torque converter 4 comprises a pump impeller 41, a turbine runner 42 that is disposed opposite to the pump impeller 41, and a stator 43 that is disposed between the pump impeller 41 and the turbine runner 42. The torque converter 4 is a fluid coupling that transmits torque by the hydraulic oil filled therein being circulated to each blade of the pump impeller 41, the turbine runner 42, and the stator 43. The pump impeller 41 is coupled to the engine output shaft 2 via a converter cover 44, the inner surface of which is the engagement surface of the lock-up clutch 3. The turbine runner 42 is coupled to the transmission input shaft 5. The stator 43 is coupled to a stationary member (transmission case, etc.) via a one-way clutch 45.

The continuously variable transmission 6 is a belt-type continuously variable transmission that continuously controls the transmission ratio by changing the belt contact diameters between a primary pulley and a secondary pulley, and the output rotation after shifting is transmitted to the drive wheels 8 via a driveshaft 7.

The vehicle control system comprises an engine control unit 11 (ECU), a CVT control unit 12 (CVTCU), and a CAN communication line 13, as illustrated in FIG. 1. An engine rotation sensor 14, a turbine rotation sensor 15 (=CVT input rotation sensor), and a CVT output rotation sensor 16 (=vehicle speed sensor) are provided as sensors for obtaining input information. Further provided are an accelerator position opening amount sensor 17, a secondary rotational speed sensor 18, a primary rotational speed sensor 19, a transmission hydraulic oil temperature sensor 20, and other sensors and switches 21.

The engine control unit 11 outputs an engine torque command value so as to obtain the target engine torque, when a target engine torque is calculated from the accelerator position opening amount and the engine rotational speed. When a request for engine torque information is received from the CVT control unit 12 via the CAN communication line 13 during a lock-up engagement control at the time of start, the target engine torque information (constant engine torque information) is provided via the CAN communication line 13.

The CVT control unit 12 carries out transmission control for controlling the transmission ratio of the continuously variable transmission 6, line pressure control, lock-up clutch control for switching between engagement/slip engagement/release of the lock-up clutch 3, and the like. Of this lock-up clutch control, in lock-up engagement control at the time of start, a lock-up capacity control for calculating the lock-up capacity command value is carried out using predictive engine torque as the engine torque signal.

Configuration of the Lock-Up Engagement Control Process

Figure 2:
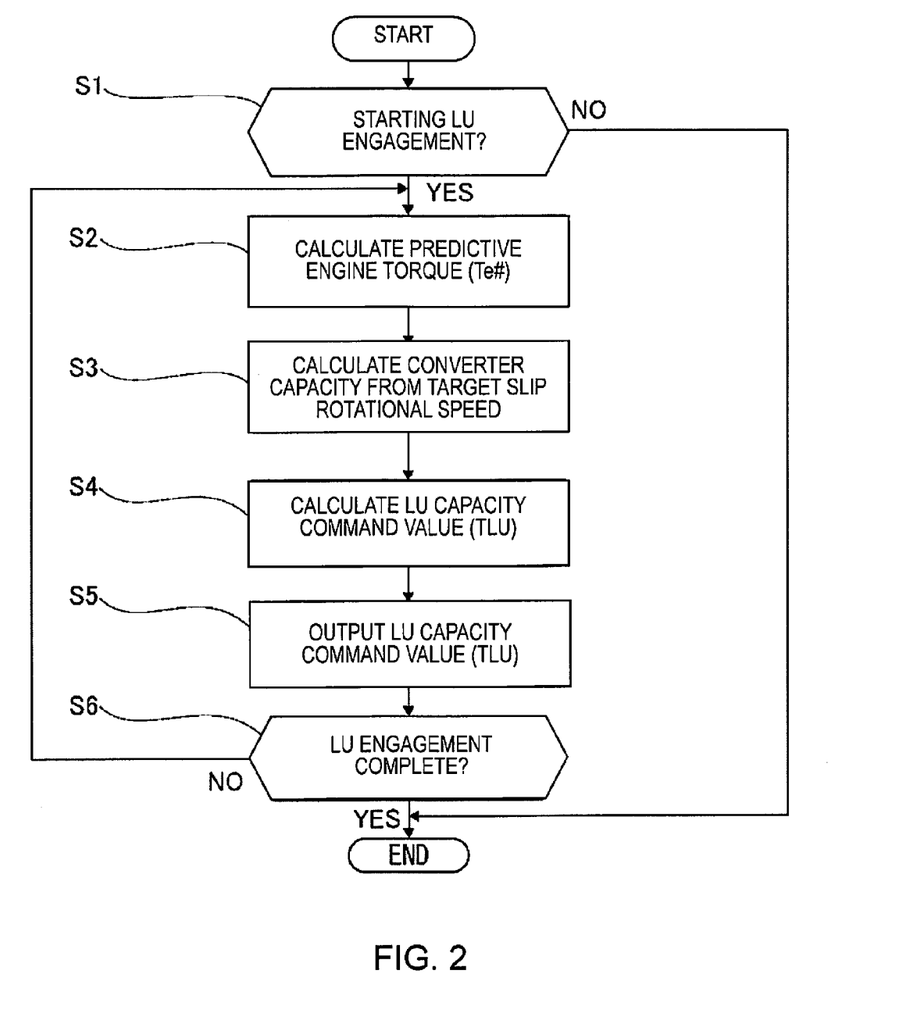
FIG. 2 is a flowchart illustrating the flow of the lock-up engagement control process that is executed in a CVT control unit of the first embodiment.

FIG. 2 illustrates the flow of the lock-up engagement control process that is executed by the CVT control unit 12 according to the first embodiment (lock-up engagement control means). Each step in FIG. 2 showing the configuration of the lock-up engagement control process will be described below. The description "LU" in FIG. 2 is an abbreviation for lock-up.

In Step S1, it is determined whether or not to start the engagement of the lock-up clutch 3, according to a lock-up engagement request. If YES (start LU engagement), the process proceeds to Step S2, and if NO (release LU), the process proceeds to END. Here, a lock-up engagement request is output at the time of the start by an accelerator depression operation, or when an operating point determined by the vehicle speed and the accelerator position opening amount crosses a lock-up engagement line on a lock-up map, and the like.

In Step S2, following a start LU engagement determination in Step S1, or an LU engagement incomplete determination in Step S6, a predictive engine torque (Te#) that is faster in response than the actual engine torque (Te) is calculated, and the process proceeds to Step S3. Here, the predictive engine torque (Te#) is calculated based on an engine torque air response delay (hereinafter referred to as "engine torque response delay") and a hydraulic response delay in the lock-up differential pressure (hereinafter referred to as "LU differential response delay") according to a calculation block illustrated in FIG. 4. Details will be described later.

Figure 3:
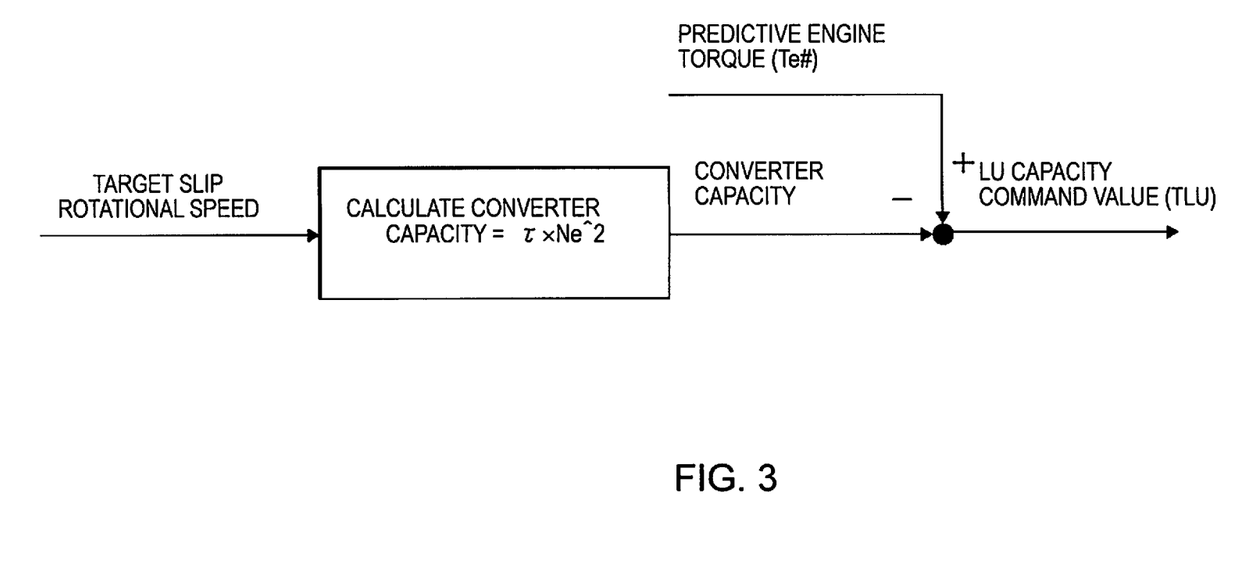
FIG. 3 is a block diagram illustrating the process of calculating the lock-up capacity command value in the lock-up engagement control process of the first embodiment.
Figure 4:
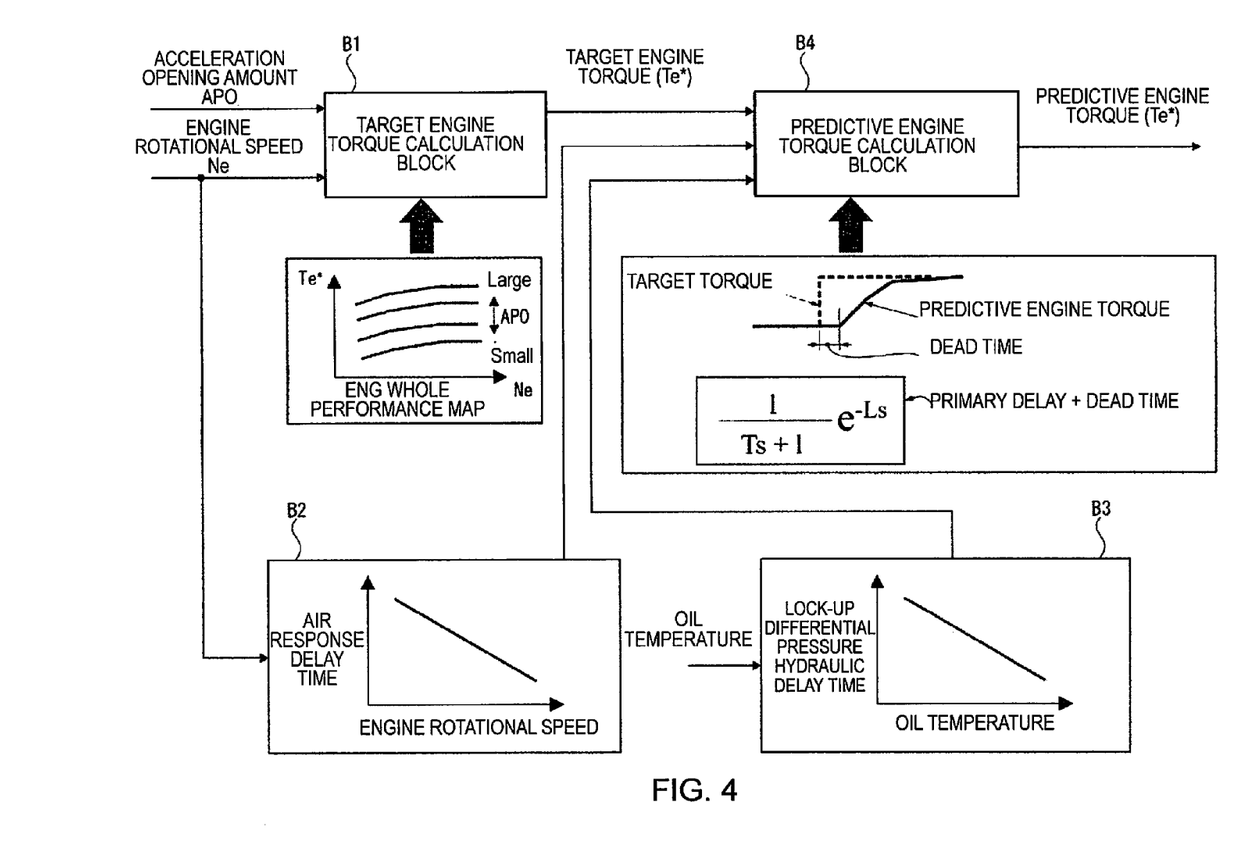
FIG. 4 is a block diagram illustrating the process of calculating the predictive engine torque in the lock-up engagement control process of the first embodiment.

In Step S3, following the calculation of the predictive engine torque (Te#) in Step S2, the converter capacity is calculated from the target slip rotational speed, and the process proceeds to Step S4. Here, the target slip rotational speed characteristic of the lock-up engagement transition period is set to a characteristic with which the target slip rotational speed increases with a gradual gradient and then decreases (refer to FIG. 7). Then, the speed ratio is determined from the target slip rotational speed, and the torque capacity coefficient τ is obtained from the speed ratio and the torque converter performance curve, as illustrated in FIG. 4, and the converter capacity is calculated from the formula:

Converter capacity=$\tau \times Ne^2$ wherein $Ne^2$: engine rotational speed Ne squared In Step S4, following the calculation of the converter capacity in Step S3, the LU capacity command value (TLU) is calculated based on the predictive engine torque (Te#) and the converter capacity, and the process proceeds to Step S5. Here, the calculation of the LU capacity command value (TLU) is calculated by subtracting the converter capacity calculated in Step S3 from the predictive engine torque (Te#) calculated in Step S2, as illustrated in FIG. 3.

In Step S5, following the calculation of the LU capacity command value (TLU) in Step S4, the calculated LU capacity command value (TLU) is output from the CVT control unit 12, and the process proceeds to Step S6.

In Step S6, following the output of the LU capacity command value (TLU) in Step S5, it is determined whether or not the engagement of the lock-up clutch 3 has been completed. If YES (LU engagement complete), the process proceeds to END, and if NO (LU engagement incomplete), the process returns to Step S2. Here, the completion of the engagement of the lock-up clutch 3 is determined by the difference in the rotational speed between the engine rotational speed and the turbine rotational speed becoming equal to, or less than, an engagement completion threshold.

Configuration of the Process for Calculating the Predictive Engine Torque

FIG. 4 illustrates the process of calculating the predictive engine torque (Te#) in the lock-up engagement control process of FIG. 2. Each of the blocks in FIG. 4 that represent the configuration of the lock-up engagement control process will be described below.

The calculation processing block of the predictive engine torque (Te#) comprises a target engine torque calculation block B1, an air response delay time calculation block B2, a hydraulic response delay time calculation block B3, and a predictive engine torque calculation block B4, as illustrated in FIG. 4.

In the target engine torque calculation block B1, a target engine torque (Te*), which is a stationary torque, is calculated using the accelerator position opening amount APO from the accelerator position opening amount sensor 17, the engine rotational speed Ne from the engine rotational speed sensor 14, and a set engine whole performance map. The calculation of this target engine torque (Te*) may be carried out on the CVT control unit 12 side, or the engine control unit 11 side.

In the air response delay time calculation block B2, an air response delay time is calculated using the engine rotational speed Ne from the engine rotational speed sensor 14 and a set air response delay time map. As described in the frame of the block B2, an air response delay time characteristic line, in which the time becomes shorter as the engine rotational speed Ne is increased, is set on the air response delay time map.

In the hydraulic response delay time calculation block B3, a hydraulic response delay time of the lock-up differential pressure is calculated using the oil temperature from the transmission hydraulic oil temperature sensor 20 and a set hydraulic response delay time map. As described in the frame of the block B3, a hydraulic response delay time characteristic line, in which the time becomes shorter as the oil temperature is increased, is set on the hydraulic response delay time map.

The predictive engine torque calculation block B4 receives the target engine torque (Te*), the air response delay time, and the hydraulic response delay time, and calculates a predictive engine torque (Te#), which is a transient torque that has (primary delay +dead time) with respect to the target engine torque (Te*). In the block B4, the time obtained by subtracting the hydraulic response delay time from the air response delay time shall be the dead time. That is, the target engine torque (Te*) provided with a primary delay is the engine torque command value, and that which has a dead time in this engine torque command value is the predictive engine torque (Te#).

Next, the actions are described. "Lock-up engagement control action according to a comparative example", "Action of the lock-up engagement control process", and "Lock-up clutch control action according to the first embodiment" will be separately described regarding the actions of the lock-up clutch control device according to the first embodiment.

Lock-up Engagement Control Action According to a Comparative Example

Figure 5:
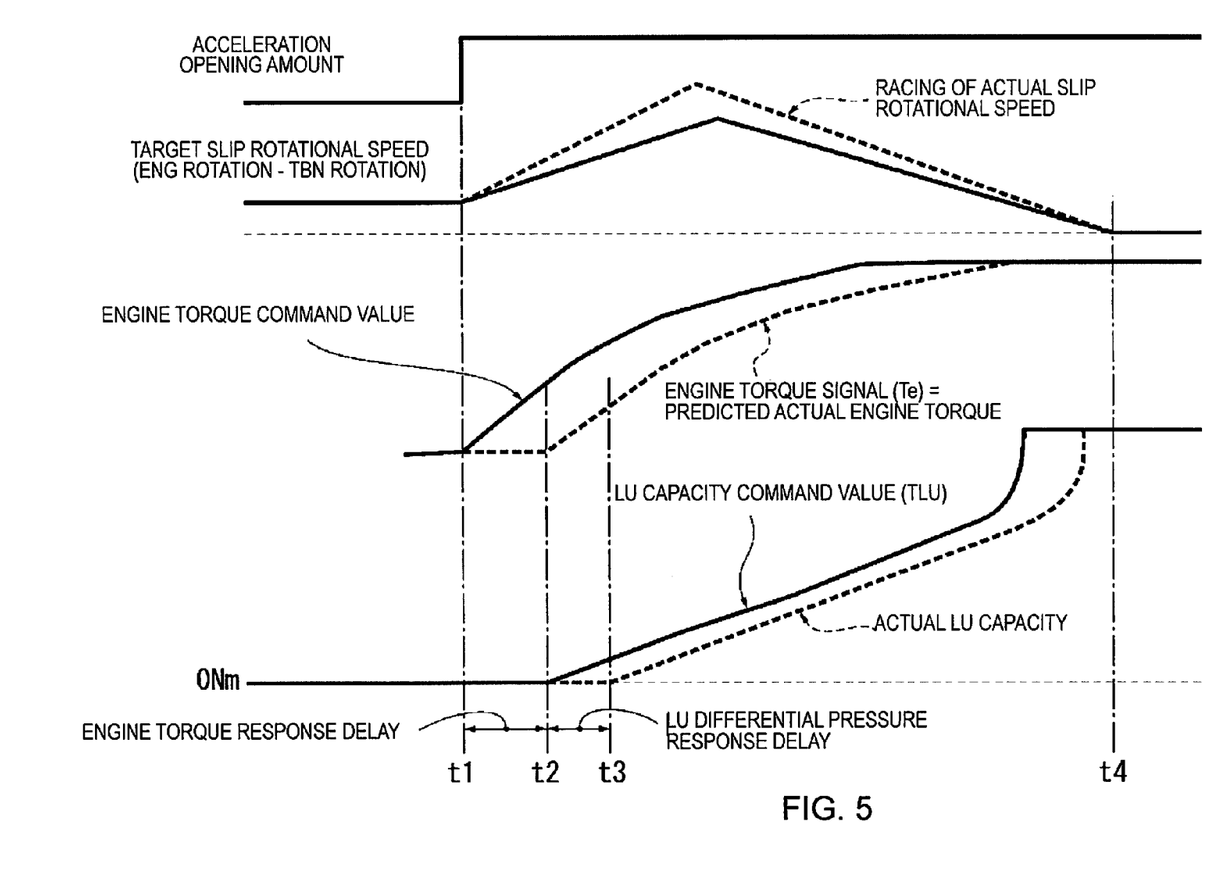
FIG. 5 is a time chart illustrating the respective characteristics of the accelerator position opening amount/target slip rotational speed (actual slip rotational speed)/engine torque command value/engine torque signal/lock-up capacity command value/actual lock-up capacity, upon lock-up engagement at the time of starting in a comparative example.

The lock-up engagement control action according to a comparative example will be described below with the time chart illustrated in FIG. 5. In FIG. 5, time t1 is the accelerator depression time, time t2 is the actual engine torque rise start time, time t3 is the actual LU capacity generation start time, and time t4 is the lock-up engagement completion time.

Figure 6:
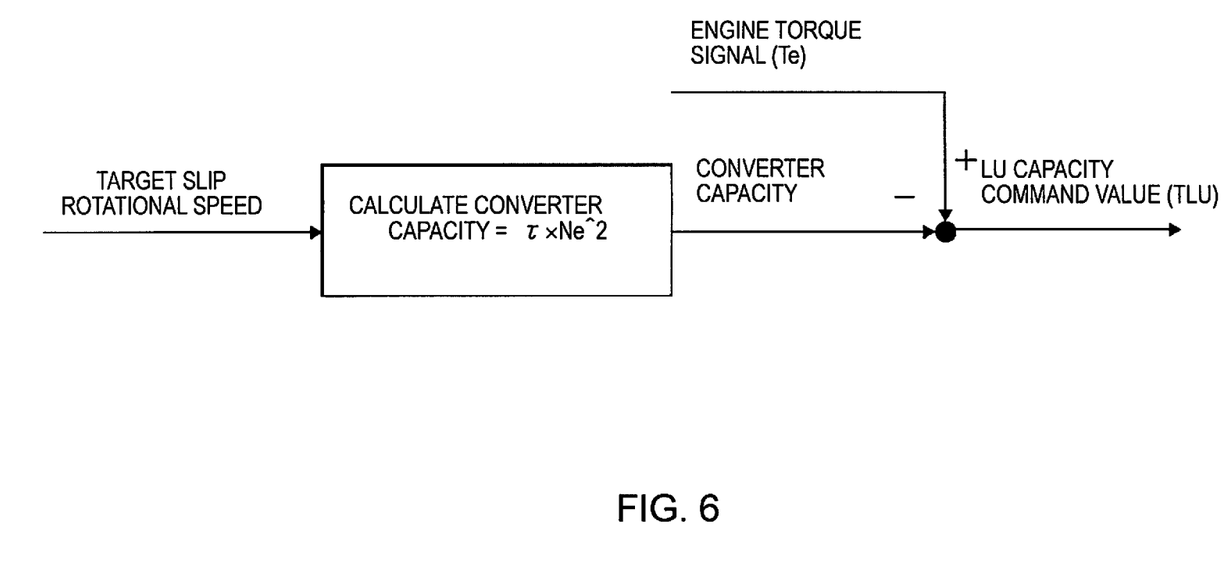
FIG. 6 is a block diagram illustrating the process of calculating the lock-up capacity command value in the lock-up engagement control process of the comparative example.

The comparative example shall be an example in which the calculation of the LU capacity command value (TLU) is calculated by subtracting the converter capacity from an engine torque signal (Te) (=predicted actual engine torque), in which the engine torque command value is provided with an engine torque response delay time, as illustrated in FIG. 6.

First, the slip rotational speed (engine rotational speed−turbine rotational speed) in a lock-up clutch is controlled by the actual engine torque and the actual LU capacity. In contrast, when the lock-up capacity control is started at a timing of time t2 at which an actual engine torque is generated, the lock-up clutch will remain in the released state (zero generation of actual LU capacity) between time t2-time t3, due to a hydraulic response delay in the LU differential pressure, as illustrated in FIG. 5. In this manner, by only the actual engine torque being generated when there is zero generation of an actual LU capacity, racing occurs in the actual slip rotational speed (engine rotational speed), as illustrated in the broken line characteristic of FIG. 5.

As described above, in the comparative example, the LU capacity command value (TLU) at the time of lock-up engagement is calculated using an actual engine torque that is inferred from the engine torque air response delay, as the engine torque signal (Te). Consequently, the balance between the actual engine torque and the actual LU capacity is disrupted due to a transient response delay in the engine torque, or a hydraulic response delay in the lock-up differential pressure, leading to a generation of shock upon lock-up engagement at time t4.

Action of the Lock-Up Engagement Control Process

The action of the lock-up engagement control process according to the first embodiment will be described below, based on the flowchart illustrated in FIG. 2 and the block diagram of FIG. 3.

When an engagement start of the lock-up clutch 3 is determined with a lock-up engagement request, the process proceeds from Step S1->Step S2->Step S3->Step S4->Step S5->Step S6, in the flowchart of FIG. 2. While the LU engagement incomplete is being determined in Step S6, the flow that proceeds from Step S2->Step S3->Step S4->Step S5->Step S6 is repeated. Thereafter, when the LU engagement complete is determined in Step S6, the process proceeds from Step S6 to END, and the LU engagement control process is completed.

That is, in Step S2, a predictive engine torque (Te#) that is faster in response than the actual engine torque (Te) is calculated. Specifically, the target engine torque (Te*) from the calculation block B1, the air response delay time from the calculation block B2, and the hydraulic response delay time from the calculation block B3 are input to the predictive engine torque calculation block B4 of FIG. 3. Then, the target engine torque (Te*) provided with a primary delay is set as the engine torque command value, and that which has a dead time (air response delay time−hydraulic response delay time) in this engine torque command value is considered as the predictive engine torque (Te#).

In the following Step S3, the converter capacity is calculated from the target slip rotational speed. At this time, the target slip rotational speed characteristic of the lock-up engagement transition period is set to a characteristic with which the target slip rotational speed increases with a gradual gradient from the time of start, after which the target slip rotational speed decreases with a gradual gradient in a direction that converges to zero (refer to FIG. 7). Then, the speed ratio is determined from the target slip rotational speed, and the torque capacity coefficient τ is obtained from the speed ratio and the torque converter performance curve, as illustrated in FIG. 4, and the converter capacity is calculated from the formula: converter capacity=τ×Ne^2.

In the following Step S4, the calculation of the LU capacity command value (TLU) is calculated by subtracting the converter capacity calculated in Step S3 from the predictive engine torque (Te#) calculated in Step S2, as illustrated in FIG. 3. Then, in Step S5, the calculated LU capacity command value (TLU) is output from the CVT control unit 12.

Lock-Up Clutch Control Action According to the First Embodiment

Figure 7:
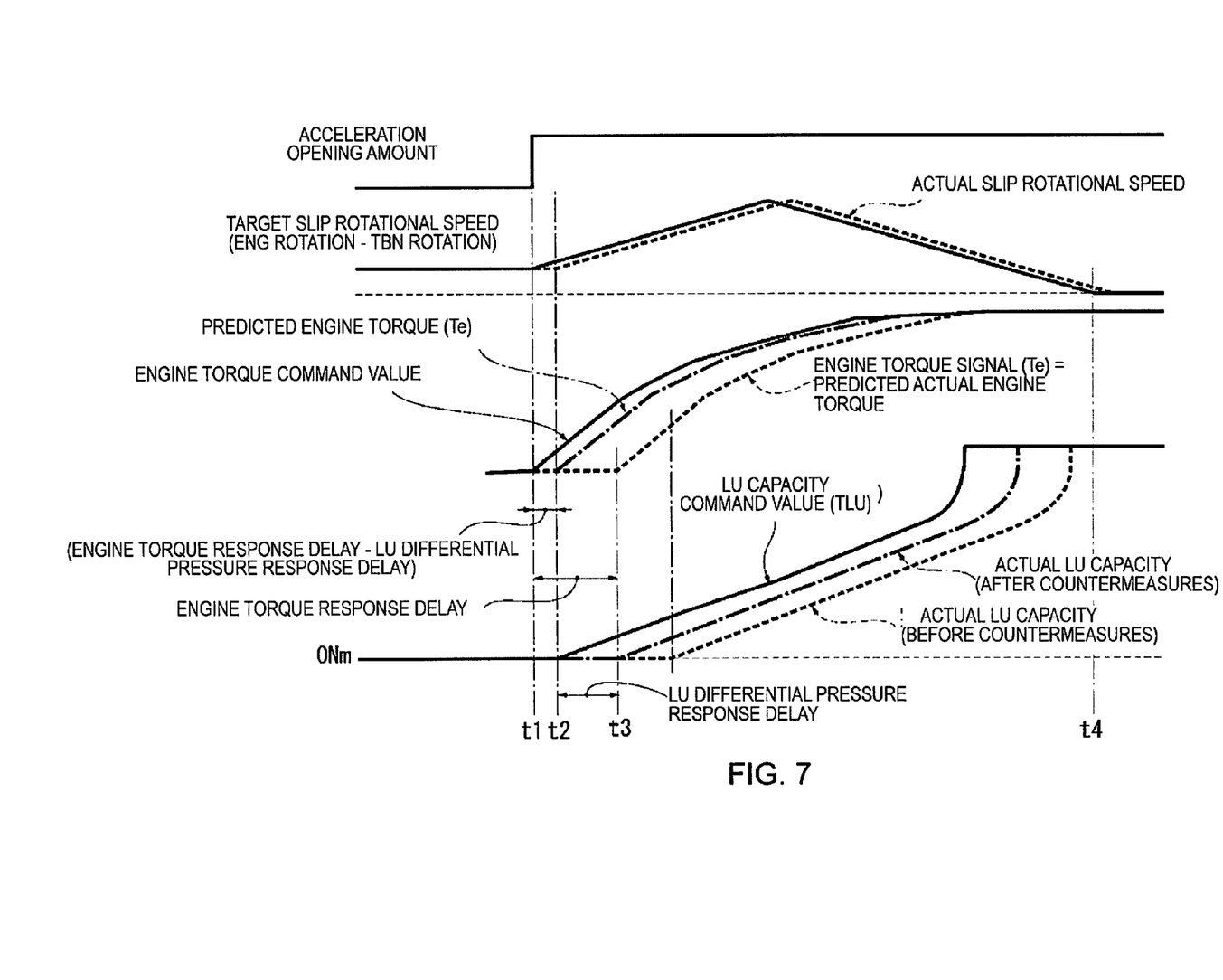
FIG. 7 is a time chart illustrating the respective characteristics of the accelerator position opening amount/target slip rotational speed (actual slip rotational speed)/engine torque command value/predictive engine torque/engine torque signal/lock-up capacity command value/actual lock-up capacity (after countermeasures)/actual lock-up capacity (before countermeasures), upon lock-up engagement at the time of starting in the first embodiment.

The lock-up engagement control action according to the first embodiment will be described below with the time chart illustrated in FIG. 7. In FIG. 7, time t1 is the accelerator depression time, time t2 is the rise start time of the predictive engine torque and the LU capacity command value, time t3 is the generation start time of the actual engine torque and the actual LU capacity, and time t4 is the lock-up engagement completion time.

When engaging the lock-up clutch at the time of start by an accelerator depression operation, the LU capacity command (TLU) is not output during the time between the accelerator depression time t1 and time t2. However, at time t2 when the predictive engine torque (Te#) starts to increase, the output of the LU capacity command (TLU) also starts to rise, and an actual LU capacity starts to be generated at time t3 after a response delay time in the LU differential pressure has elapsed. The time t3 matches, or substantially matches, the time at which an engine torque response delay time has elapsed after the engine torque command value output start time t1. In this manner, by the actual LU capacity generation timing matching (including substantially matching) the actual engine torque generation timing, the match between the target slip rotational speed characteristic (solid line characteristic) and the actual slip rotational speed characteristic (broken line characteristic) increases, as illustrated by the slip rotational speed characteristic of FIG. 7. That is, racing of the actual slip rotational speed, such as seen in the comparative example, can be suppressed.

As described above, the first embodiment is configured such that, when engaging the lock-up clutch 3, predictive engine torque (Te#) is used as the engine torque signal for use in the LU capacity control, which is calculated based on an engine torque air response delay and a hydraulic response delay in the LU differential pressure. That is, if a LU capacity control is initiated at a timing that is faster in response than the actual engine torque (Te) by the predictive engine torque (Te#), the match between the generation timing of the actual engine torque and the generation timing of the actual lock-up capacity is increased by the hydraulic response delay in the LU differential pressure. As a result, it is possible to suppress the generation of shock during the LU engagement. In other words, by generating an actual LU capacity at an appropriate timing with respect to the generation of actual engine torque, the engagement of the lock-up clutch 3 can be achieved without shock.

The first embodiment is configured such that the time obtained by subtracting the lock-up differential pressure hydraulic response delay time from the engine torque air response delay time is the dead time, and such that the predictive engine torque (Te#) is calculated from the engine torque command value and the dead time (B4 of FIG. 4). That is, if the prediction accuracy of the engine torque air response delay time and the lock-up differential pressure hydraulic response delay time is high, it is possible to match the generation timing of the actual engine torque and the generation timing of the actual LU capacity. Therefore, the match between the generation timing of the actual engine torque and the generation timing of the actual LU capacity is further increased, and the slip rotational speed of the lock-up clutch 3 is controlled to be the target slip rotational speed according to the difference between the actual engine torque and the actual LU capacity.

The first embodiment is configured to calculate the engine torque air response delay time according to the engine rotational speed (B2 of FIG. 4). That is, there is a correlation such that the engine torque air response delay time becomes longer if the engine rotational speed is low, and becomes shorter if the engine rotational speed is high. Therefore, by calculating the engine torque air response delay time according to the engine rotational speed, it is possible to obtain an accurate engine torque air response delay time.

The first embodiment is configured to calculate the lock-up differential pressure hydraulic response delay time according to the hydraulic oil temperature of the lock-up clutch 3 (B3 of FIG. 4). That is, there is a correlation such that the lock-up differential pressure hydraulic response delay time becomes longer if the oil temperature is low and the hydraulic oil viscosity is high, and becomes shorter if the oil temperature is high and the hydraulic oil viscosity is low. Therefore, by calculating the lock-up differential pressure hydraulic response delay time according to the oil temperature, it is possible to obtain an accurate lock-up differential pressure hydraulic response delay time.

In the first embodiment, the target slip rotational speed characteristic of the lock-up engagement transition period is set to a characteristic with which the target slip rotational speed increases with a gradual gradient and then decreases with a gradual gradient. The embodiment was further configured such that the converter capacity is calculated based on the target slip rotational speed, and such that the LU capacity command value (TLU) is calculated by subtracting the converter capacity from the predictive engine torque (Te#) (FIG. 3). That is, by the actual slip rotational speed characteristic of the lock-up clutch 3 being along the target slip rotational speed characteristic, the actual LU capacity which becomes a load on the engine 1 is raised earlier than in the comparative example, and the racing of the engine 1 rotation is suppressed. Then, when approaching the LU engagement completion time t4, the actual LU capacity matches the target LU capacity, and the change gradient of the actual engine torque is also suppressed to be small. Therefore, by employing an LU capacity control that uses the predictive engine torque (Te#) and the target slip rotational speed characteristic, it is possible to engage the lock-up clutch 3 smoothly, without shock.

Next, the effects are described. In the lock-up clutch control device according to the first embodiment, the effects listed below can be obtained.

(1) In a vehicle provided with a torque converter 4 comprising a lock-up clutch 3 between an engine 1 and a transmission (continuously variable transmission 6), provided with a lock-up engagement control means (FIG. 2) that controls a lock-up capacity based on an engine torque signal, when engaging the lock-up clutch 3, the lock-up engagement control means (FIG. 2) uses a predictive engine torque (Te#) as the engine torque signal for use in the lock-up capacity control, the predictive engine torque being calculated based on an engine torque air response delay and a hydraulic response delay in the lock-up differential pressure and is faster in response than the actual engine torque (Te). Accordingly, when engaging the lock-up clutch 3, by generating an actual lock-up capacity (actual LU capacity) at an appropriate timing with a high match with respect to the generation of the actual engine torque (Te), the engagement of the lock-up clutch 3 can be achieved without shock.

(2) The lock-up engagement control means (FIG. 2) uses the time obtained by subtracting the lock-up differential pressure hydraulic response delay time from the engine torque air response delay time as the dead time, and calculates the predictive engine torque (Te#) from the engine torque command value and the dead time (FIG. 4). Accordingly, in addition to the effect of (1), the match between the generation timing of the actual engine torque and the generation timing of the actual lock-up capacity (actual LU capacity) is further increased, and the slip rotational speed of the lock-up clutch 3 is controlled to be the target slip rotational speed.

(3) The lock-up engagement control means (FIG. 2) calculates the engine torque air response delay time according to the engine rotational speed Ne (B2 of FIG. 4). Accordingly, in addition to the effect of (2), it is possible to obtain an accurate engine torque air response delay time, which is affected by the engine rotational speed Ne.

(4) The lock-up engagement control means (FIG. 2) calculates the lock-up differential pressure hydraulic response delay time according to the hydraulic oil temperature of the lock-up clutch 3 (B3 of FIG. 4). Accordingly, in addition to the effect of (2) or (3), it is possible to obtain an accurate lock-up differential pressure hydraulic response delay time, which is affected by the oil temperature.

(5) The lock-up engagement control means (FIG. 2) sets the target slip rotational speed characteristic of the lock-up engagement transition period to a characteristic with which the target slip rotational speed is increased with a gradual gradient and then decreased with a gradual gradient; calculates the converter capacity based on the target slip rotational speed; and calculates the lock-up capacity command value (TLU) by subtracting the converter capacity from the predictive engine torque (Te#) (FIG. 3). Accordingly, in addition to the effects of (1) to (4), by employing an LU capacity control that uses the predictive engine torque (Te#) and the target slip rotational speed characteristic, it is possible to engage the lock-up clutch 3 smoothly, without shock.

The lock-up clutch control device of the present invention was described above based on the first embodiment, but specific configurations thereof are not limited to the first embodiment, and various modifications and additions to the design can be made without departing from the scope of the invention according to each claim.

In the first embodiment, an example was shown in which the lock-up clutch 3 is engaged at the time of start, as the lock-up engagement control means. However, the lock-up engagement control means may be an example in which the lock-up clutch 3 is engaged not only at the time of start, but also during traveling.

In the first embodiment, an example was shown in which the time obtained by subtracting the lock-up differential pressure hydraulic response delay time from the engine torque air response delay time is the dead time, as the lock-up engagement control means. However, the lock-up engagement control means may be an example in which the dead time is determined giving consideration to response delay times other than the two response delay times, when there are other response delays in the system.

In the first embodiment, an example was shown in which the lock-up clutch control device of the present invention is applied to an engine-equipped vehicle equipped with a continuously variable transmission. However, the lock-up clutch control device of the present invention may be applied to a hybrid vehicle, and the transmission may be a stepped transmission that carries out stepped automatic shifting, as long as the vehicle is equipped with an engine as a drive source. In short, the lock-up clutch control device may be applied to any vehicle provided with a torque converter comprising a lock-up clutch between the engine and the transmission.

The invention claimed is:

1. A vehicle lock-up clutch control device for a vehicle provided with a torque converter having a lock-up clutch between an engine and a transmission, the vehicle lock-up clutch control device comprising:
a control unit programmed to include
a lock-up capacity control that controls a lock-up capacity based on an engine torque signal, when engaging the lock-up clutch,
the lock-up capacity control using a predictive engine torque as the engine torque signal, the predictive engine torque being calculated based on an engine torque air response delay and a hydraulic response delay in a lock-up differential pressure and being faster in response than actual engine torque, and
the lock-up capacity control using time obtained by subtracting a lock-up differential pressure hydraulic response delay time from an engine torque air response delay time as a dead time, and calculates the predictive engine torque from an engine torque command value and the dead time.

2. The vehicle lock-up clutch control device according to claim 1, wherein
the control unit is further programmed such that the lock-up capacity control calculates the engine torque air response delay time according to an engine rotational speed.

3. The vehicle lock-up clutch control device according to claim 2, wherein
the control unit is further programmed such that the lock-up capacity control calculates the lock-up differential pressure hydraulic response delay time according to the hydraulic oil temperature of the lock-up clutch.

4. The vehicle lock-up clutch control device according to claim 2, wherein
the control unit is further programmed such that the lock-up capacity control:
sets a target slip rotational speed characteristic of a lock-up engagement transition period to a characteristic with which the target slip rotational speed increases with a gradual gradient compared to a racing gradient of an engine rotational speed and then decreases with a gradual gradient from a raised target slip rotational speed toward a zero slip rotational speed;
calculates a converter capacity based on the target slip rotational speed; and
calculates a lock-up capacity command value by subtracting the converter capacity from the predictive engine torque.

5. The vehicle lock-up clutch control device according to claim 1, wherein
the control unit is further programmed such that the lock-up capacity control calculates the lock-up differential pressure hydraulic response delay time according to the hydraulic oil temperature of the lock-up clutch.

6. The vehicle lock-up clutch control device according to claim 5, wherein
the control unit is further programmed such that the lock-up capacity control:

sets a target slip rotational speed characteristic of a lock-up engagement transition period to a characteristic with which the target slip rotational speed increases with a gradual gradient compared to a racing gradient of an engine rotational speed and then decreases with a gradual gradient from a raised target slip rotational speed toward a zero slip rotational speed;

calculates a converter capacity based on the target slip rotational speed; and calculates a lock-up capacity command value by subtracting the converter capacity from the predictive engine torque.

7. The vehicle lock-up clutch control device according to claim 1, wherein the control unit is further programmed such that the lock-up capacity control:

sets a target slip rotational speed characteristic of a lock-up engagement transition period to a characteristic with which the target slip rotational speed increases with a gradual gradient compared to a racing gradient of an engine rotational speed and then decreases with a gradual gradient from a raised target slip rotational speed toward a zero slip rotational speed;

calculates a converter capacity based on the target slip rotational speed; and calculates a lock-up capacity command value by subtracting the converter capacity from the predictive engine torque.

* * * * *